(12) United States Patent
Kaiser et al.

(10) Patent No.: US 6,987,239 B2
(45) Date of Patent: Jan. 17, 2006

(54) METHOD FOR PRODUCING SEAL-WELDED CONNECTIONS BETWEEN A STAMPED GRID AND A PLASTIC COMPONENT

(75) Inventors: Klaus Kaiser, Markgroeningen (DE); Markus Michels, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 10/452,572

(22) Filed: May 30, 2003

(65) Prior Publication Data
US 2004/0031562 A1 Feb. 19, 2004

(30) Foreign Application Priority Data
Jun. 4, 2002 (DE) .......................... 102 24 685

(51) Int. Cl.
*B23K 26/00* (2006.01)

(52) U.S. Cl. .............................. 219/121.64; 219/121.63
(58) Field of Classification Search ............ 219/121.64, 219/121.63, 121.85, 121.65, 121.66; 439/1, 439/43, 217, 374
See application file for complete search history.

(56) References Cited

U.S. PATENT DOCUMENTS

| 4,714,315 A | * | 12/1987 | Krause | ........................ 385/96 |
| 6,333,483 B1 | | 12/2001 | Ueno | |

FOREIGN PATENT DOCUMENTS

| GB | 2237442 | 5/1991 |
| JP | 60-214929 | 10/1985 |
| JP | 2000-343232 | 12/2000 |

\* cited by examiner

Primary Examiner—M. Alexandra Elve
(74) Attorney, Agent, or Firm—Kenyon & Kenyon

(57) ABSTRACT

A method for producing a seal-welded connection between a stamped grid designed to conduct electricity and embedded in a laser-transparent plastic, and a plastic component positioned underneath the stamped grid, using a laser method, including the following method steps, executable in any order: a) carrying out a first welding operation by emitting laser beams, the laser beams falling on the surface of the stamped grid embedded in the plastic, at an angle α, and the angle α being inclined in a positive direction with respect to the vertical; and b) carrying out a further welding operation by emitting laser beams, the laser beams falling on the surface of the stamped grid embedded in the plastic, at an angle α, and the angle α being inclined in a negative direction with respect to the vertical.

2 Claims, 2 Drawing Sheets

METHOD FOR PRODUCING SEAL-WELDED CONNECTIONS BETWEEN A STAMPED GRID AND A PLASTIC COMPONENT

FIELD OF THE INVENTION

The present invention relates to a method for producing a seal-welded connection between a stamped grid (pressed screen) embedded in a laser-transparent plastic and designed to transmit (conduct) electricity, and a plastic component, using a laser-welding method.

BACKGROUND INFORMATION

Stamped grids are used to produce electrical connections between individual control units and loads. As a rule, such stamped grids take the form of a plug (plug-in) module, in that the stamped grid is inserted into a housing, fixed in position, and sealed in the housing in a fluid-tight manner. On its ends, the plug module designed in this manner has suitable contact pins by which electrical connections to the individual control units or loads can be produced.

Plug modules of the related art are very expensive to manufacture. Several working steps and additional auxiliary processing materials are required for manufacturing such plug modules in a fluid-tight manner. The plurality of working steps allows corresponding errors to occur, so that proper quality control is necessary.

SUMMARY OF THE INVENTION

An object of the present invention is to reduce the manufacturing costs of such plug modules in comparison with the related art.

A main idea for achieving the object is to embed a stamped grid in a laser-transparent plastic and to weld this component to the housing (plastic component) by a laser-welding method in such a manner that an uninterrupted, welded seam is formed between the embedded, stamped grid and the plastic component.

An important advantage of the present invention is that the number of corresponding components for manufacturing such plug modules is sharply reduced. In addition, a fluid-tight plug module is produced by a single working step, so that the corresponding production costs may be reduced considerably.

In particular, these advantages are attained by using a laser-welding method for welding the stamped grid embedded in the plastic to a further plastic component. The wavelength of the laser is selected to pass nearly unhindered through the plastic in which the stamped grid is embedded. In order to prevent the plastic from being welded to the plastic component in the region of the shadow of the individual conducting paths of the stamped grid, the laser beam should be oriented in such a manner, that it at least does not fall, or is not emitted, onto the stamped grid in an exclusively perpendicular manner. It is provided that, in a first working step, the laser beam initially strike the surface of the stamped grid embedded in the plastic, at a positive angle to the vertical, and that, in a further working step, the laser beam then strike it at an angle in the negative direction with respect to the vertical; the two mentioned working steps also being able to be performed in reverse order. The emission of the laser at an angle prevents a "shadow" from forming beneath the stamped grid, and therefore prevents a non-seamless, welded connection from being formed between the stamped grid embedded in the plastic, and the plastic component.

An advantageous refinement provides for welding to be initially conducted with the aid of laser beams emitted at right angles to the expansion direction of the stamped grid, and for one more welding zone to be likewise produced in a further working step, in particular in the shadow region, by emitting the laser beams at an angle.

As an alternative to this, the stamped grids or the individual conductor tracks of the stamped grid may be designed in such a manner, that their expansion in a direction perpendicular to the emitted beams is very small, so that they only produce a very small shadow in the region of the welding zone. A higher welding power (laser power) then allows the edge regions to melt as well, so that complete overlap occurs in the event of a very small shadow, and a continuous weld may therefore be produced.

DETAILED DESCRIPTION

Figure 1:
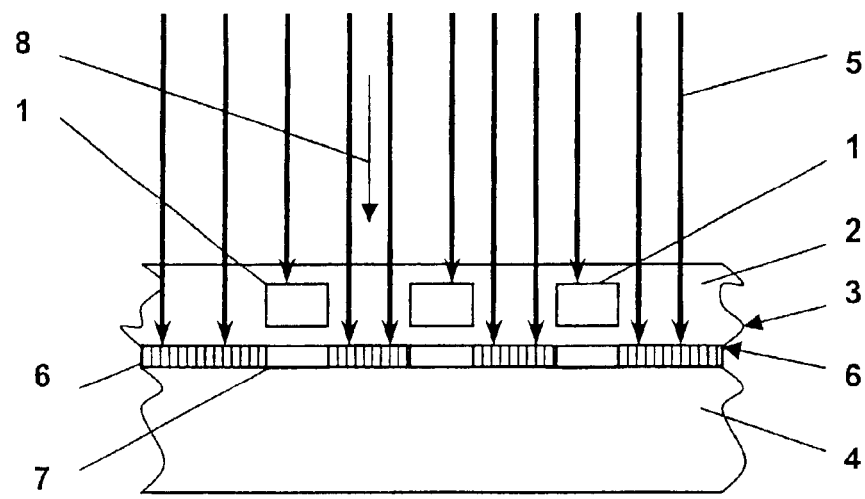
FIG. 1 shows a schematic representation of the welding according to a first working step.

FIG. 1 shows a diagrammatic representation of the method according to the present invention. Stamped, metallic grid 1 schematically represented here is embedded in a laser-transparent plastic. This component 3, which is made up of stamped, metallic grid 1 and plastic part 2 accommodating stamped, metallic grid 1, rests on plastic component 4 to be welded. Plastic component 4 is laser-absorbing. This means that the emitted laser power is absorbed and melting occurs due to the heat introduced. Laser beams 5 represented here schematically are emitted at right angles to the longitudinal extension of the stamped grid and therefore produce regions of a welding zone 6, as well as shadow regions 7. Shadow regions 7 develop directly below stamped, metallic grid 1 in the form of a "shadow".

In order to produce a continuous, laser-welded seam between component 3 and plastic component 4, laser beams 5 are not emitted in the vertical direction (arrow 8), but rather in a direction at an angle to the vertical direction (arrow 8). In the exemplary embodiment represented in FIG. 2, angle α formed between emitted laser beams 5 and the vertical direction (arrow 8) is positive. In contrast to this, a negative angle α is represented in FIG. 3.

Figure 2:
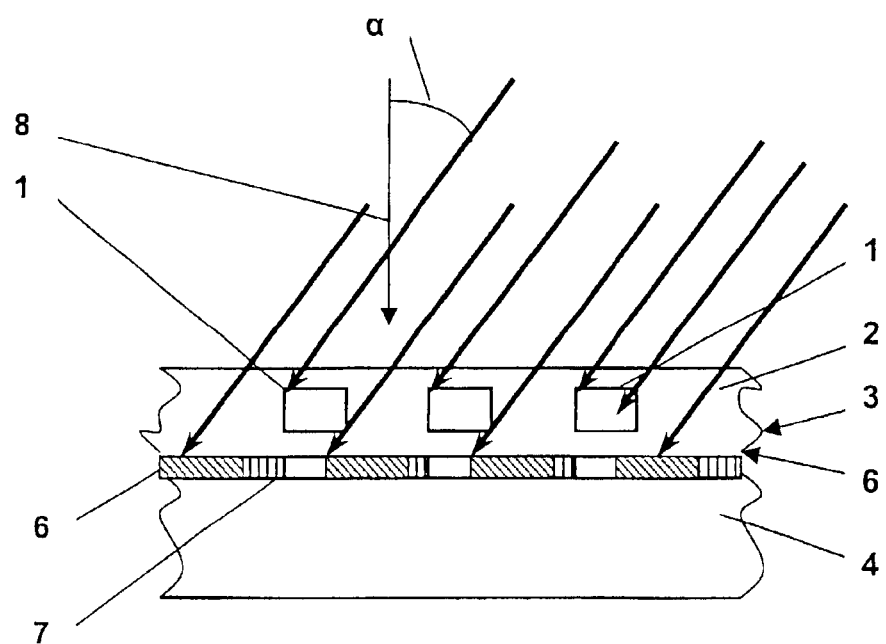
FIG. 2 shows a schematic representation of the welding according to a second working step.
Figure 3:
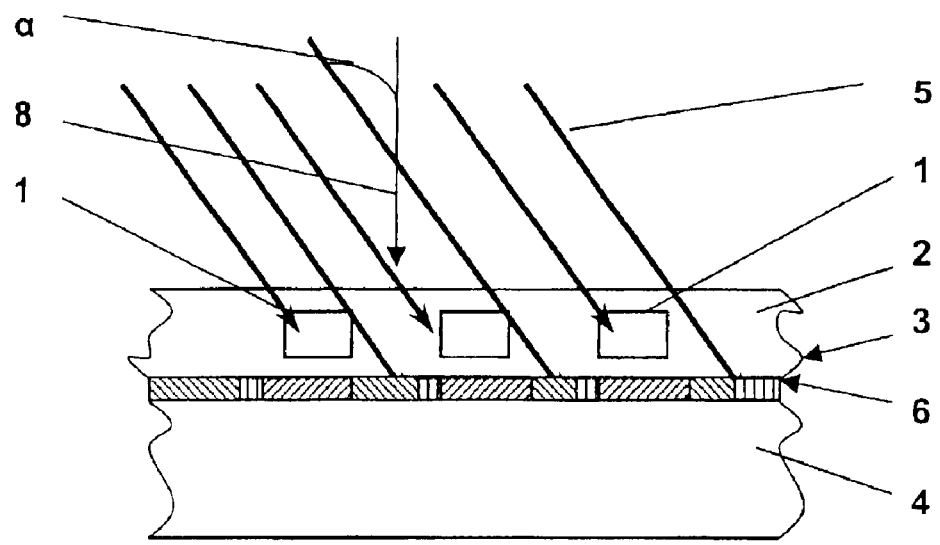
FIG. 3 shows a schematic representation of the welding according to a third working step.

Shadow regions 7 are reduced in size by the laser emission represented in FIG. 2 and completely eliminated by the additional welding operation as shown in FIG. 3, so that a continuous and, therefore, fluid-tight welding zone is hereby formed.

Figure 4:
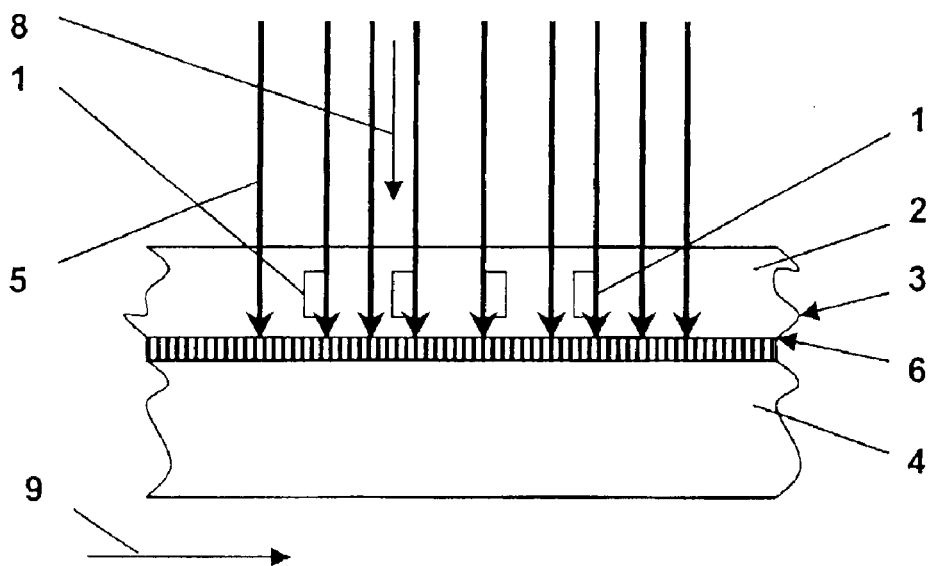
FIG. 4 shows a schematic representation of an alternative variant for laser-welding a stamped grid embedded in plastic, to a plastic component.

In contrast to the exemplary embodiments represented in FIGS. 1–3, the cross-section of stamped, metallic grid 1 in the exemplary embodiment represented in FIG. 4 is specially adapted to the method. It has a very small width in the direction of its longitudinal extension (arrow 9), so that very small shadow regions are formed in welding zone 6 during the production of the welded connection. Increased laser power allows the edge zones in welding zone 6 to be melted, and therefore allows welding to take place in shadow region 7, as well.

In comparison with the related art, the method of the present invention allows a reduction in the total cost of manufacturing plug modules, which have seal-welded plastic components that possess stamped grids.

What is claimed is:

1. A method for producing a seal-welded connection between a stamped grid, adapted to conduct electricity and embedded in a laser-transparent plastic, and a plastic component, positioned underneath the stamped grid, using a laser method, the method comprising the following steps, performed in any order:

a) carrying out a welding operation by emitting laser beams, the laser beams falling on a surface of the stamped grid embedded in the plastic, at a predetermined angle, the predetermined angle being inclined in a positive direction with respect to a vertical direction; and b) carrying out another welding operation by emitting laser beams, the laser beams falling on a surface of the stamped grid embedded in the plastic, at a predetermined angle, the predetermined angle being inclined in a negative direction with respect to a vertical direction.

2. The method according to claim 1, wherein, in a first method step, prior to steps a) and b), the laser beams fall onto the stamped grid in the vertical direction.

* * * * *